US011398757B2

(12) United States Patent
Sawata et al.

(10) Patent No.: US 11,398,757 B2
(45) Date of Patent: Jul. 26, 2022

(54) COOLING OF ELECTRIC MOTORS

(71) Applicant: Hamilton Sundstrand Corporation, Charlotte, NC (US)

(72) Inventors: Tadashi Sawata, Coventry (GB); Andrew Page, Tring (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 141 days.

(21) Appl. No.: 16/665,191

(22) Filed: Oct. 28, 2019

(65) Prior Publication Data
US 2020/0195073 A1    Jun. 18, 2020

(30) Foreign Application Priority Data

Dec. 13, 2018  (EP) ..................... 18212263

(51) Int. Cl.
*H02K 1/32*    (2006.01)
(52) U.S. Cl.
CPC ..................... *H02K 1/32* (2013.01)
(58) Field of Classification Search
CPC ...... H02K 1/32; H02K 1/278; H02K 2213/03; H02K 9/19
USPC ........................................................ 310/61
See application file for complete search history.

(56) References Cited

U.S. PATENT DOCUMENTS

| 6,234,767 | B1 | 5/2001 | Takeda et al. | |
| 7,514,827 | B2 | 4/2009 | Hall | |
| 2008/0197725 | A1* | 8/2008 | Husband | H02K 1/20 310/59 |
| 2013/0200735 | A1 | 8/2013 | Lynch et al. | |
| 2013/0241336 | A1 | 9/2013 | Kottmyer et al. | |
| 2014/0333163 | A1 | 11/2014 | Horii | |
| 2014/0363314 | A1* | 12/2014 | Jiang | F04F 5/16 417/84 |
| 2015/0288255 | A1* | 10/2015 | Barker | H02K 9/197 310/43 |
| 2016/0149450 | A1* | 5/2016 | Horii | H02K 1/2766 310/54 |
| 2017/0012500 | A1 | 1/2017 | Brauer et al. | |
| 2017/0222525 | A1* | 8/2017 | Matsuoka | H02K 21/14 |

FOREIGN PATENT DOCUMENTS

| CN | 101752968 A | 6/2010 |
| CN | 107749678 A | 3/2018 |

OTHER PUBLICATIONS

Translation of foreign Patent document CN 107749678 A (Year: 2018).*
Extended European Search Report for International Application No. 18212263.0 dated Jul. 1, 2019, 10 pages.

* cited by examiner

*Primary Examiner* — Alex W Mok
(74) *Attorney, Agent, or Firm* — Cantor Colburn LLP

(57) ABSTRACT

An electric motor includes one or more channels or grooves for directing fluid along the rotor as the rotor rotates.

11 Claims, 3 Drawing Sheets

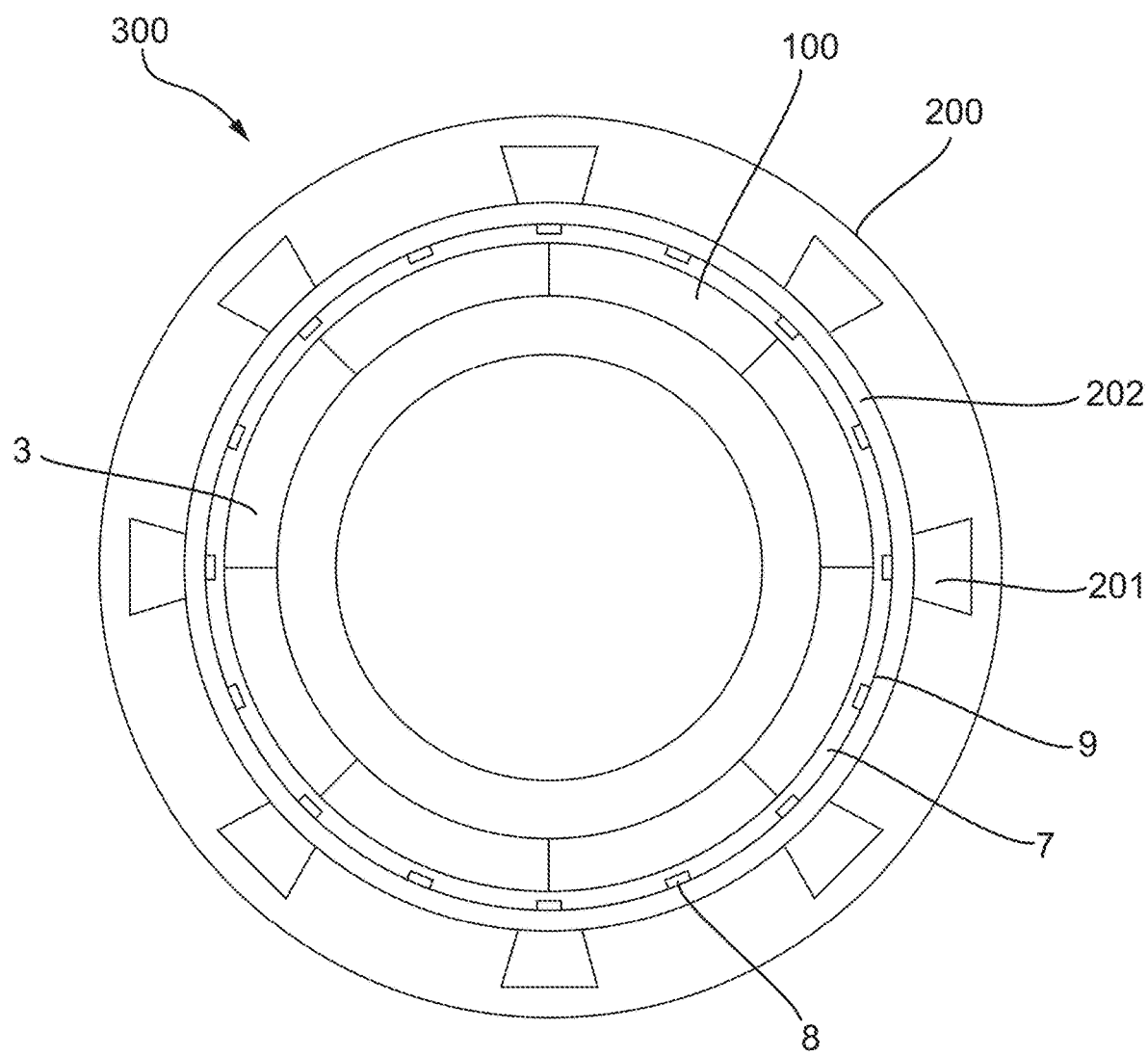

COOLING OF ELECTRIC MOTORS

FOREIGN PRIORITY

This application claims priority to European Patent Application No. 18212263.0 filed Dec. 13, 2018, the entire contents of which is incorporated herein by reference.

FIELD

The present disclosure relates generally to the electric motors, and particularly to means for cooling of magnets in electric motors.

BACKGROUND

Electric motors will generally comprise a rotor which rotates about a longitudinal axis, and a stator which remains static. One of the rotor and the stator may comprise one or more permanent magnets, whilst the other of the rotor and the stator comprises one or more windings, such that the rotor is forced to rotate when electric current is provided to the windings. Alternatively, both of the rotor and stator may be provided with windings (forming an induction machine). In use, as the rotor rotates, the components of the electric motor may become hot, and so it may be desirable to cool the electric motor to maintain a stable operating temperature.

SUMMARY

The present disclosure provides a rotor for an electric motor, the rotor configured to rotate about a longitudinal axis in use. The rotor comprises one or more permanent magnets or windings, and a layer of material disposed over the permanent magnets or windings. The layer of material comprises one or more grooves or channels for directing fluid along the rotor. The layer of material may extend circumferentially around the magnets or windings so as to radially confine the magnets or windings when the rotor is rotated. The layer may cover only part of each of the magnets or windings. Alternatively, the layer may entirely cover each of the magnets or windings. The magnets or windings may be disposed on a shaft, and the layer of material may circumferentially surround the shaft and the magnets or windings.

When a rotor is used as part of an electric motor, parts of the rotor may become hot, and so it may be desirable to cool the rotor. The inventors have recognised that cooling of the rotor may be assisted by using grooves or channels to direct fluid along the rotor. In particular, by providing at least one groove or channel in a layer of material disposed over the permanent magnets or windings, it is possible to direct the fluid close to the surface of the magnets or windings, e.g. to cool those parts of the magnets that experience the greatest heating effect due to eddy currents.

As used herein, "permanent magnet" may have the conventional meaning, i.e. a magnet which retains its magnetisation in the absence of an inducing field or current. A winding may comprise wire or other conducting material arranged as one or more coils. A winding may be configured as an electromagnet, such that it generates a magnetic field when a current is applied to it. Alternatively, an electric current may be induced in a winding in the presence of an applied, external, magnetic field.

The fluid may comprise a liquid such as oil or water, or a gas such as air.

The layer of material may comprise carbon fibre (e.g. carbon fibre reinforced polymer, CFRP), glass fibre (e.g. glass fibre reinforced polymer, GFRP), or metal such as steel (e.g. Inconel) or titanium.

The layer of material may comprise banding wound around the rotor. The banding may comprise carbon fibre or glass fibre. Banding materials incorporating carbon fibre or glass may have sufficient tensile strength to resist centrifugal forces on the magnets when the rotor rotates. Such materials are also electrically insulating, and can therefore avoid the formation of eddy currents in the banding (which would cause energy to be lost as heat). Alternatively, the layer of material may comprise a sleeve which may be pulled over or fixed around the rotor.

One or more grooves may be provided in a radially outermost surface of the layer of material.

From a manufacturing point of view, a groove may efficiently be provided in a radially outermost surface of the layer of material, for example, by machining the groove after the layer of material has been provided on the rotor. Since fluid can then be directed through the groove when the rotor rotates in use, this can generate a fluid flow along the rotor to cool the rotor. The groove can also allow the fluid to pass closer to the magnets or windings for cooling.

Furthermore, when the rotor is used as part of an electric motor, the rotor may be radially surrounded by the stator. There may only be a small gap forming a mechanical clearance between the rotor and stator. The Applicants have recognised that it can be difficult to urge fluid through the gap. However, by forming grooves in the outermost surface of the layer of material (such that the groove opens into the gap), the groove may direct fluid along the longitudinal direction of the rotor, and may assist with urging fluid into the gap.

The rotor may have a length between a first longitudinal end and a second longitudinal end, and each groove or channel may extend from the first longitudinal end of the rotor to the second longitudinal end of the rotor.

The first and second longitudinal ends of the rotor may correspond to first and second longitudinal ends of the layer of material which is disposed over the permanent magnets or windings.

Each groove or channel may terminate at the longitudinal ends of the rotor, allowing fluid to enter the channel at the first end of the rotor, and to exit the channel at the second end of the rotor. Each groove or channel may direct fluid along the entire length of the rotor.

The rotor may have a length between a first longitudinal end and a second longitudinal end, and each groove or channel may comprise a leading portion that begins at the first longitudinal end of the rotor and extends towards the second longitudinal end of the rotor. A path formed by the leading portion may have a direction having a component in a longitudinal direction of the rotor and a component in a circumferential direction of the rotor. In this manner, the leading portion may be directed away from the longitudinal axis. The leading portion may be directed away from a longitudinal direction of the rotor such that there is a non-zero angle between a path formed by the leading portion and the longitudinal direction of the rotor. This can assist with urging fluid into the channel as the rotor is rotated.

Each groove or channel may comprise a longitudinally central portion which is fluidly connected to the leading portion, wherein a path formed by the central portion is substantially parallel to the longitudinal axis. Hence, the central portion may be configured to urge fluid relatively rapidly along the length of the rotor.

Each groove or channel may comprise a trailing portion which is fluidly connected to the central portion at an opposite longitudinal side thereof to the leading portion, and which extends towards the second longitudinal end of the rotor. A path formed by the trailing portion may have a direction having a component in the longitudinal direction of the rotor and a component in the circumferential direction of the rotor.

The trailing portion may allow fluid to be exhausted from the channel.

The leading portion may extend around the rotor in a first circumferential direction as a function of distance from the first longitudinal end of the rotor towards the central portion, and the trailing portion may extend around the rotor in the first circumferential direction as a function of distance from the central portion to the second longitudinal end of the rotor.

Having both the leading and trailing portions extending in the same circumferential direction around the rotor means that the fluid will be urged into and along the groove or channel regardless which direction the rotor is rotated. If the direction of rotation is reversed, then the direction in which fluid flows will be reversed.

Each groove or channel may be substantially S-shaped.

The present disclosure also provides a rotor for an electric motor, the rotor configured to rotate about a longitudinal axis in use, the rotor comprising one or more grooves or channels for directing fluid along the rotor in a substantially longitudinal direction. Each groove or channel extends from a first longitudinal end of the rotor to a second longitudinal end of the rotor, and a leading portion of each groove or channel extends in a direction away from the longitudinal axis so as to urge fluid into the groove or channel as the rotor rotates.

Each groove or channel may comprise a central portion which is fluidly connected to the leading portion, and a trailing portion which is fluidly connected to the central portion. The leading portion may be directed away from a longitudinal axis of the rotor such that there is a non-zero angle between a path formed by the leading portion and the longitudinal axis of the rotor. A path formed by the central portion is substantially parallel to the longitudinal axis of the rotor. The trailing portion may be directed away from the longitudinal axis of the rotor such that there is a non-zero angle between a path formed by the trailing portion and the longitudinal axis of the rotor.

The grooves or channels may each have an S-shape.

In this regard, it is recognised that grooves or channels having the shape described herein may be useful for directing fluid along the longitudinal direction of the rotor as the rotor rotates, regardless of where the channel is provided on the rotor. The channels may comprise channels or grooves in a layer of material (e.g. such as banding) disposed on the rotor for retaining the magnets in their positions. Alternatively, the channels may be formed in a shaft of the rotor, or any other component of the rotor that will rotate in use.

The present disclosure also provides an electric motor comprising the rotor described herein, wherein the electric motor further comprises a stator.

There may be a gap between the stator and the rotor. Each groove may open into the gap, such that when the rotor rotates in use, fluid is urged into the gap.

The electric motor may comprise one or more permanent magnets disposed on the stator or the rotor, and one or more windings disposed on the other of the stator or the rotor. Alternatively, windings may be provided on both the rotor and the stator of the electric motor.

The present disclosure also provides a method of manufacturing a rotor described herein. The method comprises disposing one or more permanent magnets or windings on the rotor, providing the layer of material over the permanent magnets or windings, and providing one or more grooves or channels in the layer of material before or after the layer of material has been provided on the rotor.

Providing the layer of material may comprise winding a banding material around the rotor. Alternatively, providing the layer of material may comprise providing a sleeve, by pulling the sleeve over the rotor or otherwise fixing the sleeve around the rotor.

Providing the one or more grooves or channels may be performed using any suitable apparatus, such as a drill, cutter, laser, or other apparatus. Providing the one or more grooves or channels may comprise drilling, cutting, etching or any other suitable process for forming grooves or channels in the layer of material.

The rotor may be provided with permanent magnets and the stator provided with windings. The rotor may be placed within the stator when assembling the electric motor. In this case, the layer of material may provide a restraining force which resists centrifugal forces on the magnets when the rotor rotates. Alternatively, the stator may be placed within the rotor when assembling the electric motor, such that the rotor radially surrounds the stator. In this alternative, the layer of material which is disposed over the permanent magnets may be configured to assist with holding the magnets in place against centripetal forces. In another alternative, the rotor and stator may both comprise windings.

BRIEF DESCRIPTION OF THE DRAWINGS

Various embodiments will now be described, by way of example only, and with reference to the accompanying drawings in which:

FIG. 2 shows an axial view comprising the rotor of FIGS. 1A and 1B, surrounded by a stator.

DETAILED DESCRIPTION

The present disclosure relates to means for cooling electric motors. The electric motor comprises a rotor which rotates about a longitudinal axis, and a stator which remains static. One of the rotor and stator may comprise one or more permanent magnets, whilst the other of the rotor and the stator comprises one or more windings, such that the rotor is forced to rotate when electric current is provided to the windings. Alternatively, both the rotor and stator may be provided with windings. In use, as the rotor rotates, the components of the electric motor may become hot, and so it may be desirable to cool the electric motor, e.g. to maintain a stable operating temperature.

Embodiments of the present disclosure include means for cooling an electric motor which incorporates a rotor that comprises permanent magnets.

Figure 1A:
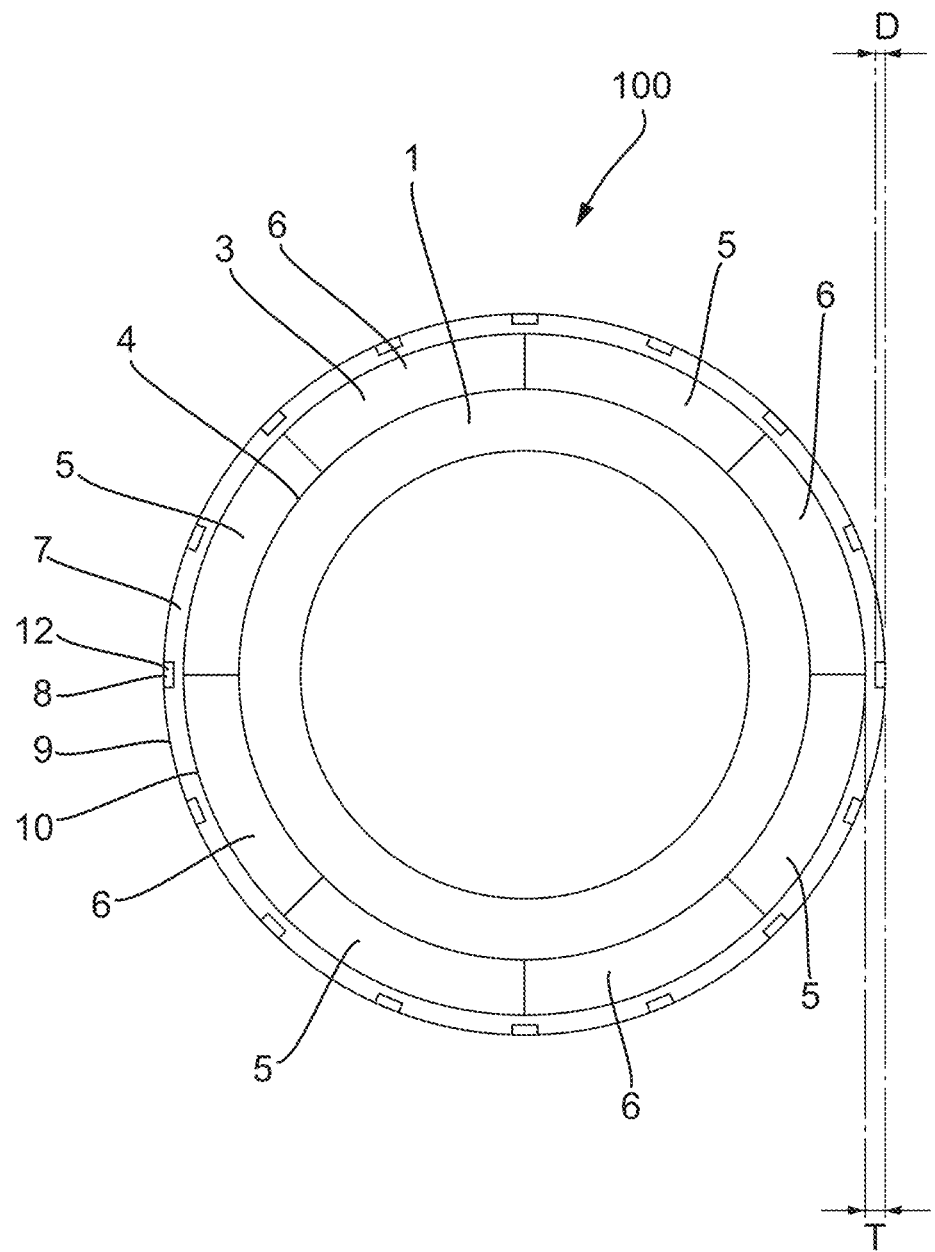
FIG. 1A shows an axial view of a rotor according to an embodiment.
Figure 1B:
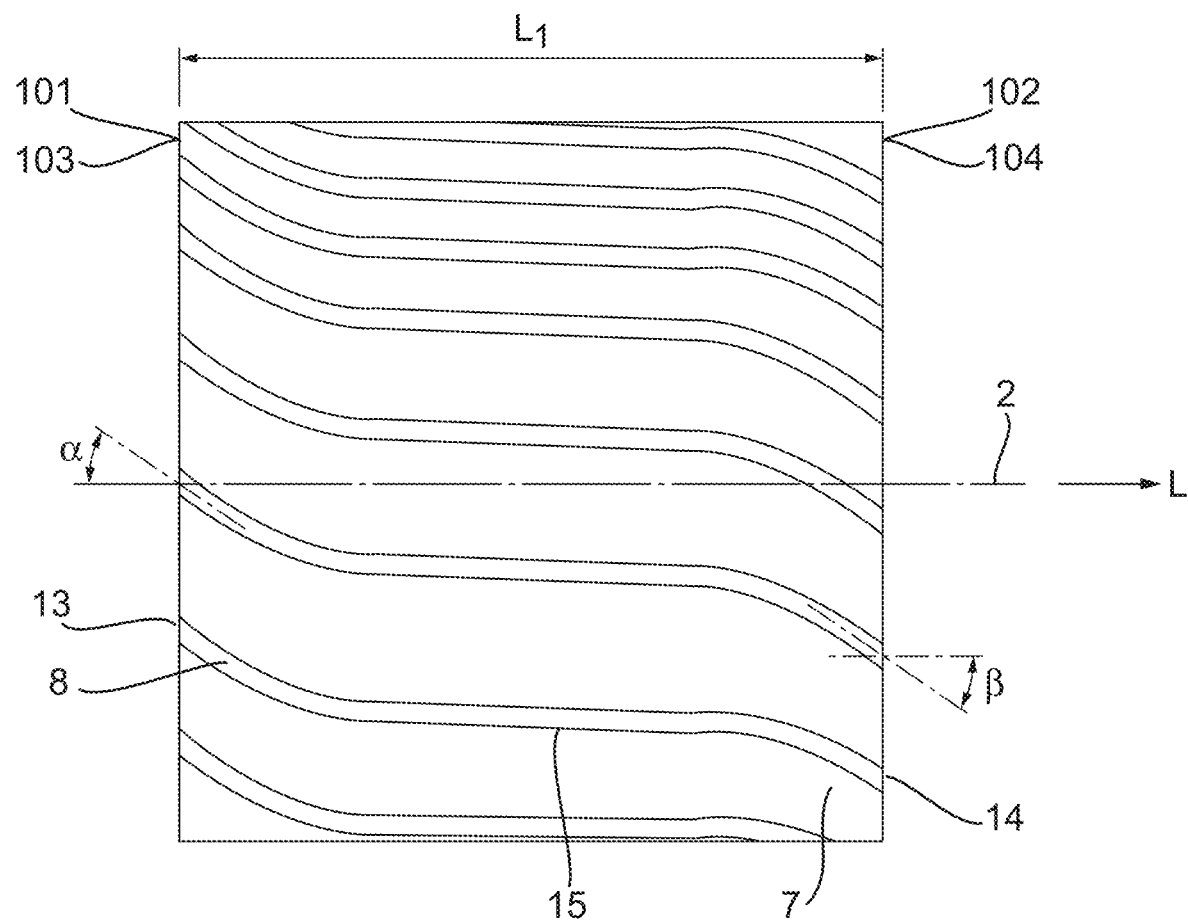
FIG. 1B shows a longitudinal side view of the rotor of FIG. 1A.

FIGS. 1A and 1B show a rotor 100 according to an embodiment. FIG. 1A shows a view of the rotor 100, as viewed along a longitudinal axis 2 extending through the centre of the rotor, and FIG. 1B shows a side view of the rotor. The rotor has a length Li between a first longitudinal end 101 and a second longitudinal end 102. The rotor 100 is configured to rotate about the longitudinal axis 2 in use, wherein the longitudinal axis 2 defines a longitudinal direction L (shown in FIG. 1B).

The rotor 100 comprises a shaft 1 and permanent magnets 3 which are disposed on the shaft 1. As shown in FIG. 1A, the magnets 3 are disposed on a radially outer surface 4 of the shaft 1. The magnets 3 may be releasably or permanently attached to the shaft 1, e.g. by means of a suitable mounting. Alternatively one or more other components may be provided between the shaft 1 and the magnets 3 so that the magnets are not disposed directly on the shaft.

The permanent magnets 3 are arranged such that, in a circumferential direction around the shaft, there are magnetic poles 5,6 which alternate between a first magnetic polarity (poles 5) and a second magnetic polarity (poles 6) which is opposite to the first polarity. For example the first polarity may be a north polarity, and the second polarity may be a south polarity. The alternating polarities may be achieved by providing permanent magnets 3 which are positioned circumferentially around the rotor such that circumferentially adjacent poles 5,6 are the poles of different magnets 3. In this case, each of the permanent magnets 3 has its opposing poles at opposite longitudinal ends of the rotor. Alternatively, any other suitable arrangement of permanent magnets may be provided on the shaft to provide alternating poles (e.g. alternating north and south poles) around the circumference of the rotor. For example, circumferentially adjacent opposing poles 5, 6 may correspond the north and south poles of a single permanent magnet.

As used herein, "permanent magnet" may have the conventional meaning, i.e. a magnet which retains its magnetisation in the absence of an inducing field or current.

The permanent magnets 3 referred to herein may comprise rare earth metal permanent magnets. The permanent magnets 3 may comprise an alloy comprising at least one rare-earth element, such as neodymium (although other rare-earth elements could be used). Rare-earth permanent magnets are generally strong, and can provide a large magnetic loading when the rotor 100 is used as part of an electric motor.

As the rotor rotates in use, the magnets 3 may be subjected to centrifugal forces. The rotor is therefore provided with a layer of material 7 which is configured to resist centrifugal forces on the magnets due to rotation of the rotor about its longitudinal axis 2 in use. The layer of material 7 can therefore assist in holding the magnets 3 in position, and preventing the magnets 3 from moving out of position as the rotor 100 rotates in use. The layer of material 7 is disposed over the permanents magnets, so that the material covers the permanent magnets 3. As shown in FIG. 1A, the layer of material 7 is radially outwards of the shaft 1 and magnets 3 (wherein "radially" refers to the "radial" direction which is perpendicular to the longitudinal direction L of the rotor). The layer of material 7 extends circumferentially about the rotor to surround the shaft 1 and the permanent magnets 3.

In the embodiment shown in FIG. 1A, the layer of material 7 is continuous in the circumferential direction of the rotor, such that the layer fully surrounds the shaft 1 and magnets 3 (in the circumferential direction of the rotor). The layer of material 7 also extends in the longitudinal direction L of the rotor 100, and may extend along substantially the entire length Li of the rotor. For instance, as shown in FIG. 1B, the layer of material 7 may extend from a first longitudinal end 101 of the rotor to a second longitudinal end 102 of the rotor (such that a first longitudinal end 103 of the layer of material aligns with the first longitudinal end 101 of the rotor, and a second longitudinal end 104 of the layer of material aligns with the second longitudinal end 102 of the rotor).

The layer of material 7 may comprise banding material which may be wound around the rotor to cover the shaft 1 and the magnets 3. The banding may comprise a tape or other sheet-like material which may be wound around the rotor in a circumferential direction. The layer of material 7 may comprise one or more layers of banding. The banding material may comprise glass fibres and/or carbon fibres.

The layer of material 7 may comprise a material which is different to the material of the shaft (the shaft being formed, for example, from a suitable metal or metal alloy). The layer of material 7 may comprise a material that has sufficient tensile strength to retain the magnets 3 in position when the rotor 100 is rotated as part of an electric motor. The layer of material 7 may be electrically insulating to avoid eddy currents forming in the layer of material (when the rotor is used as part of an electric motor), which may lead to power losses. In embodiments, the layer of material may comprises glass fibres and/or carbon fibres.

Although a banding material has been described herein, the layer of material 7 may instead (or additionally) comprise other types of material. For example, the layer of material 7 may comprise a sleeve of material which may be positioned over the shaft 1 and magnets 3 by pulling the sleeve over shaft and magnets or by connecting two or more parts of the sleeve around the shaft and magnets. The sleeve may comprise carbon fibre (e.g. carbon fibre reinforced polymer, CFRP), glass fibre (e.g. glass fibre reinforced polymer, GFRP), or metal such as steel (e.g. Inconel) or titanium.

Although FIGS. 1A and 1B shows a layer of material 7 which is continuous and which encloses the entire shaft 2 and the magnets 3, other layer configurations may be used, provided that the layer is capable of assisting with holding the magnets in position. For example, the layer of material 7 could be discontinuous in the circumferential direction and/or the longitudinal direction of the rotor, e.g. comprising discrete pieces of material. The layer could also, or instead, extend over only part of the magnets, and/or along only part of the longitudinal length Li of the rotor 100.

In embodiments, the layer of material 7 has one or more grooves 12 or channels 8 therein (as shown in FIG. 1B), which are configured to urge a fluid along the length of the rotor as the rotor rotates in use. The flow of fluid along the length of the rotor may assist in cooling the rotor, especially when it is used as part of an electric motor. The fluid may comprise any fluid that is suitable for cooling the rotor, such as air, water, oil or another liquid or gas.

As shown in FIG. 1A, the layer of material 7 has a thickness T between a first (radially outermost) surface 9 and a second (radially innermost) surface 10 of the layer of material 7. In embodiments comprising one or more groove 12, the groove 12 extends into the layer of material 7 through the first surface 9 of the layer of material 7, i.e. the groove 12 is open at the radially outer side. The groove 12 has depth D extending from the first surface 9 towards the second surface 10. The depth D of the groove 8 is less than the thickness T of the layer of material 7. Alternatively, or additionally, embodiments of the rotor may comprise one or more channels 8, i.e. a closed structure other than at its longitudinal ends. Such a channel may be formed, for example, by forming a groove into the layer of material 7 from the second (radially innermost) surface 10 towards the radially first (radially outermost) surface 9 and locating this layer 7 around the shaft 1 so as to define the channel 8 between the shaft 1 and layer 7. Alternatively, the channel could comprise a channel running between the inner and outer surfaces of the layer of material 7.

Each groove 12 or channel 8 provides a pathway for fluid (e.g. air) to flow along the length of the rotor. Each groove 12 or channel 8 may extend along the longitudinal length Li of the rotor from the first longitudinal end 101 to the second longitudinal end 102 of the rotor, or at least part way along such a length.

Each groove 12 or channel 8 has a leading portion 13 which is configured to urge fluid (e.g. air) into the groove 12 or channel as the rotor 100 rotates about its longitudinal axis L. The leading portion 13 may start at the first longitudinal end 103 of the layer of material 7 (corresponding to the first longitudinal end 101 of the rotor). The leading portion 13 forms a pathway which extends towards the second longitudinal end 102 of the rotor, but at an angle to the longitudinal direction L.

The pathway formed by the leading portion 13 of the groove 12 or channel 8 has a direction which has a component in the longitudinal direction L and a component in the circumferential direction of the rotor 100. In this manner, the leading portion 13 does not extend directly in the longitudinal direction L of the rotor 100, but instead extends at a non-zero angle relative to the longitudinal direction L. At the first longitudinal end 101 of the rotor 100, the acute angle α between the direction of the path formed by the leading portion 13 and the longitudinal direction L is greater than zero (such the path extends away from the longitudinal direction). The angle α is less than 90 degrees. In embodiments, the angle α may be between 20 degrees and 70 degrees, or between 30 degrees and 60 degrees, or approximately 45 degrees. Having the pathway extending away from the longitudinal direction in this manner can assist with urging fluid into the channel 8 as the rotor rotates.

As mentioned above, the leading portion 13 of the groove 12 or channel 8 forms a pathway which has a direction with a component in the longitudinal direction L and a component in the circumferential direction. Hence, when viewed from the first longitudinal end 101 of the rotor 100, the path formed by the leading portion 13 may extend from an entrance end of the groove 12 or channel 8 located at or towards one end 101 of the rotor, clockwise about the rotor as it simultaneously extends in the longitudinal direction L. In this case, the rotor 100 is configured to rotate anti-clockwise in use, such that fluid is urged into the groove 12 or channel 8 as the rotor rotates. Alternatively, the leading portion of the groove 12 or channel 8 could extend in the anti-clockwise direction, in which case the rotor would be configured to rotate in a clockwise direction.

The leading portion 13 is fluidly connected to a longitudinally central portion 15 of the groove 12 or channel 8. The central portion may form a path which extends at an angle to the longitudinal direction that is less that the angle α at which the leading portion extends. The central portion 15 may thus assist in directing fluid along the length of the rotor 100. The angle between the longitudinal axis L and the path formed by the central portion 15 may extend at an angle relative to the longitudinal direction, which may be less than 30 degrees, or less than 15 degrees, or less than 10 degrees. The angle between the longitudinal axis L and the path formed by the central portion 15 may be approximately 0 degrees so that that axis of the central portion is substantially aligned with the longitudinal direction L.

The central portion 15 is fluidly connected to a trailing portion 14 of the groove 12 or channel 8. The trailing portion 14 forms a pathway that extends towards (and optionally up to) the second longitudinal end 102 of the rotor. Fluid may be exhausted from the groove 12 or channel 8 through the exit end of the trailing portion 14. The pathway formed by the trailing portion 14 of the groove 12 or channel 8 may have a direction which has a component in the longitudinal direction L and a component in the circumferential direction of the rotor 100. In this manner, the trailing portion 14 does not extend directly in the longitudinal direction L of the rotor 100, but at an angle to the longitudinal direction L. At the second longitudinal end 102 of the rotor 100, the angle β between the direction of the path formed by the trailing portion 14 and the longitudinal direction L is greater than zero (such the path extends away from the longitudinal direction). The angle β is less than 90 degrees. In embodiments, β may be between 20 degrees and 70 degrees, between 30 degrees and 60 degrees or approximately 45 degrees. Having the pathway extending away from the longitudinal direction in this manner can assist with drawing fluid out of the groove 12 or channel 8 as the rotor rotates.

In embodiments, angle β is substantially equal to angle α such that the leading portion 13 and the trailing portion 14 extend in the same direction and at the same angle relative to the longitudinal direction. This allows the rotor to be rotated in either direction (clockwise or anti-clockwise) whilst urging fluid through the grooves or channels at the same rate. Fluid will be urged in a different direction along the length of the rotor depending on the direction of rotation of the rotor. To provide fluid transport which is the same regardless of the direction of rotation of the rotor, the channel may have two-fold rotational symmetry about an axis perpendicular to the longitudinal direction L.

As mentioned above, the trailing portion 14 of the channel 8 forms a pathway which has a direction with a component in the longitudinal direction L and a component in the circumferential direction. Hence, when viewed from the first longitudinal end 101 of the rotor 100, the path formed by the trailing portion 14 may extend clockwise about the rotor whilst simultaneously extending in the longitudinal direction L.

In embodiments, the paths formed by both the leading portion 13 and the trailing portion 14 extend clockwise. In this case, fluid will move from the leading portion 13 to the trailing portion 14 when the rotor is rotated in an anti-clockwise direction. Conversely, fluid will move from the portion 14 to the portion 13 when the rotor is rotated in a clockwise direction. Hence, the channel 8 will urge fluid along the length of the rotor 100 regardless of which direction the rotor is rotated.

Alternatively, the leading portion 13 and trailing portion 14 could both extend in the anti-clockwise direction, in which case fluid will move from the leading portion 13 to the trailing portion 14 when the rotor is rotated in a clockwise direction.

As shown in FIGS. 1A and 1B, there are plural grooves 12 or channels 8 in the layer 7, wherein each groove 12 or channel 8 may have the characteristics described above. The grooves 12 or channels 8 may each have the same shape, and may not intersect. The grooves 12 or channels 8 may be spaced circumferentially about the rotor, e.g. being evenly spaced. For example, the leading end 14 of each of the channels 8 may be spaced circumferentially from the leading end 14 of an adjacent channel.

The rotor 100 may be part of an electric motor. FIG. 2 shows an example of an electric motor 300 incorporating the rotor 100.

As shown in FIG. 2, the rotor 100 may be disposed within a stator 200, such that the stator radially surrounds the rotor.

The stator 200 may be configured to remain static in use, such that the stator does not rotate when operating the electric motor 300. The stator may comprise windings 201. In use, the motor may be operated by providing an electric current to the windings 201 to produce a magnetic field which interacts with the magnetic fields of the permanent magnets 3 and hence causes the rotor 100 to rotate about its axis 2.

As the rotor 100 rotates eddy currents may be induced in the permanent magnets 3 due to magnetic interactions between the windings 201 and the magnets 3. The eddy currents may result in energy being dissipated as heat. Factors which may contribute to the formation of eddy currents are armature reaction, harmonics in the stator magnetomotive force (MMF), pulse width modulation (PWM) control and high electrical frequencies. It may be desirable to avoid increases in the operational temperature of the motor due to build up of heat. For example, high temperatures may reduce the magnetic loading of the motor (e.g. since heat can cause the permanent magnets to become at least partially demagnetised).

The inventors have recognised that the heating effect may be most significant at a radially outer region of the permanent magnets 3 (as they are closest to the windings 201). In this regard, the inventors have recognised that it may be useful to specifically cool the radially outer surface of the magnets 3 (which is closest to the windings 201, and where the heating due to induced eddy currents is most significant) and that it may be useful to direct a fluid along the length of the rotor to cool the radially outer surface of the rotor 100.

As shown in FIG. 2 there is a gap 202 (a mechanical clearance) between the rotor 100 and the stator 200, which allows the rotor to rotate freely without friction between the rotor and the stator. The gap 202 may be relatively small, e.g. corresponding to a clearance of a few millimetres, or even one millimetre. The inventors have recognised that it may be difficult to force a cooling fluid (e.g. such as air) through the gap 202 and that by providing the rotor with grooves 12 or channels 8 of the type described above it may be possible to use the rotation of the rotor to urge fluid along the length of the rotor 100 (e.g. through gap 202) to perform the cooling.

As described above, the grooves 12 or channels 8 may be provided in a layer of material 7 which is disposed over the magnets (for resisting centrifugal forces acting on the magnets). The layer of material 7 should be sufficiently strong to resist the centrifugal forces experienced in use, and may also be electrically insulating to avoid eddy currents forming in the layer of material. However, the inventors have recognised that materials satisfying these criteria may have a relatively poor thermal conductivity. However, by providing grooves 12 or channels 8 in the layer of material 7, fluid may be directed along the length of the grooves or channels, and therefore in closer proximity to the radially outer surface of the magnets 3 (compared to fluid which is only directed through the gap between the rotor and the stator). This may increase the efficiency with which the surface of the magnets 3 can be cooled.

Compared to arrangements without grooves 12 or channels 8 in the layer of material 7, the thickness T of the layer of material 7 may be increased so that the layer of material still provides a sufficient retentive force to hold the magnets in position against centrifugal forces. This increased thickness should not negatively affect the performance of the motor since any resulting change in the reluctance will only be minor, and will be offset by the benefit of improved cooling of the magnets 3.

When grooves 12 are provided in the layer of material 7, the grooves 12 may be formed in the layer of material 7 after the layer of material is provided over the magnets 3 on the rotor shaft 1. The grooves 12 may be machined into the layer of material 7 by any suitable means, e.g. a drill, blade, laser or other cutting apparatus. Machining such grooves 12 after applying the layer of material is a particularly effective and simple way to provide grooves 12 for cooling purposes.

Although FIGS. 1A, 1B and 2 show a particular location for the grooves 12 or channels 8, other embodiments are contemplated where the grooves or channels are provided at other locations on the rotor (e.g. other locations within the layer of material 7 or within another component of the rotor). In this regard, the inventors have recognised that such a shape of groove or channel may assist with drawing fluid along the length of the rotor as it rotates, regardless of the exact position of the grooves or channels.

FIGS. 1A, 1B and 2 show a rotor 100 which may be disposed within a stator when used as part of an electric motor. However, in other embodiments, the rotor could be configured to radially surround a stator when used as part of an electric motor, such that the stator is positioned inside the rotor. Permanents magnets may be provided on the rotor adjacent to (or at) a radially inner surface of the rotor (e.g. being positioned on a radially inner surface of a hollow shaft). In use, a radially inner portion of the magnets will experience the most significant heating due to eddy currents induced by the windings of the stator as the rotor rotates.

Therefore, in such arrangements, it may be desirable to provide the inner side of the rotor with grooves 12 or channels 8 as described above, so that fluid may be urged along the length of the rotor as the rotor rotates, to provide a cooling effect.

In such arrangements, a layer of material may be provided on the radially inner side of the rotor, similarly to the layer of material 7 discussed previously. The layer of material may be configured to hold the magnets in place against gravitational forces. There may be a gap forming a mechanical clearance between the stator and the layer of material on the rotor. It may therefore be useful to provide grooves or channels in the layer of material (e.g. such as grooves extending from a radially inner surface of the layer of material) to assist with urging fluid through the gap to cool the magnets.

Although embodiments have been described in which a rotor comprises permanent magnets and a stator comprises windings, the rotor could instead be provided with the windings and the stator provided with permanent magnets. Alternatively, both of the rotor and stator could be provided with windings (to form an induction machine). In this case, it may still be useful to provide the rotor with the grooves or channels discussed herein so as to urge fluid along the path formed by the grooves or channels, to provide a cooling effect.

Although the present disclosure has been described with reference to various embodiments, it will be understood by those skilled in the art that various changes in form and detail may be made without departing from the scope of the invention as set forth in the accompanying claims.

The invention claimed is:

1. A rotor for an electric motor, the rotor configured to rotate about a longitudinal axis in use, the rotor comprising:
   one or more permanent magnets or windings; and
   a layer of material disposed over the permanent magnets or windings, wherein the layer of material extends circumferentially around the magnets or windings so as to radially confine the magnets or windings when the rotor is rotated;
   wherein the layer of material comprises one or more grooves or channels for directing fluid along the rotor,
   wherein the rotor has a length between a first longitudinal end and a second longitudinal end, wherein the first longitudinal end is opposite to the second longitudinal end, and each groove or channel extends along a fluid path from the first longitudinal end of the rotor to the second longitudinal end of the rotor to direct fluid along the entire length of the rotor, wherein the fluid path of each groove or channel consists of a single path formed by a leading portion, a central portion and a trailing portion, wherein the leading portion extends from the first longitudinal end to the central portion and around the rotor in a first circumferential direction, wherein the central portion interconnects the leading and trailing portions, and has a direction substantially parallel to the longitudinal axis, wherein the trailing portion extends from the central portion to the second longitudinal end and around the rotor in the first circumferential direction, such that the leading and trailing portions both extend in the same circumferential direction around the rotor and fluid will be urged into and along each groove or channel regardless of which direction the rotor is rotated.

2. The rotor of claim 1, wherein the layer of material comprises a banding wound around the rotor.

3. The rotor of claim 1, wherein one or more grooves are provided in a radially outermost surface of the layer of material.

4. The rotor of claim 1, wherein a path formed by the leading portion has a direction having a component in a longitudinal direction of the rotor and a component in a circumferential direction of the rotor.

5. The rotor of claim 1, wherein a path formed by the trailing portion has a direction having a component in the longitudinal direction of the rotor and a component in the circumferential direction of the rotor.

6. The rotor of claim 1, wherein the leading portion extends around the rotor only in the first circumferential direction as a function of distance from the first longitudinal end of the rotor towards the central portion, and the trailing portion extends around the rotor only in the first circumferential direction as a function of distance from the central portion to the second longitudinal end of the rotor.

7. An electric motor comprising:
the rotor of claim 1,
wherein the electric motor further comprises a stator.

8. The electric motor of claim 7, wherein there is a gap between the stator and the rotor; and wherein each groove opens into the gap, such that when the rotor rotates in use, fluid is urged into the gap.

9. A method of manufacturing the rotor of claim 1, the method comprising:
disposing the one or more permanent magnets or windings on the rotor;
providing the layer of material over the permanent magnets or windings; and
forming one or more grooves or channels in the layer of material before or after the layer of material has been provided on the rotor.

10. A rotor for an electric motor, the rotor configured to rotate about a longitudinal axis in use, the rotor comprising:
one or more grooves or channels, each configured to direct fluid along a fluid path that extends along the entire length of the rotor in a substantially longitudinal direction;
wherein each groove or channel extends from a first longitudinal end of the rotor to a second longitudinal end of the rotor, wherein the first longitudinal end is opposite to the second longitudinal end; and
wherein a leading portion of each groove or channel extends from the first longitudinal end and around the rotor in a first circumferential direction so as to urge fluid into the groove or channel as the rotor rotates in a first rotational direction,
wherein a trailing portion of each groove or channel extends to the second longitudinal end and around the rotor in the first circumferential direction so as to urge fluid into the groove or channel as the rotor rotates in a second rotational direction.

11. The rotor of claim 10, wherein each groove or channel comprises a central portion which is fluidly connected to the leading portion;
wherein the leading portion is directed away from a longitudinal axis of the rotor such that there is a non-zero angle between a path formed by the leading portion and the longitudinal axis of the rotor;
wherein a path formed by the central portion is substantially parallel to the longitudinal axis of the rotor; and
wherein the trailing portion is directed away from the longitudinal axis of the rotor such that there is a non-zero angle between a path formed by the trailing portion and the longitudinal axis of the rotor.

* * * * *